United States Patent [19]

Faulstich

[11] Patent Number: 5,028,379
[45] Date of Patent: Jul. 2, 1991

[54] FUEL HANDLING SYSTEM FOR NUCLEAR REACTOR PLANTS

[75] Inventor: David L. Faulstich, San Jose, Calif.

[73] Assignee: General Electric Company, San Jose, Calif.

[21] Appl. No.: 453,896

[22] Filed: Dec. 20, 1989

[51] Int. Cl.⁵ .............................................. G21C 17/08
[52] U.S. Cl. .................................... 376/248; 376/288; 358/100; 358/229
[58] Field of Search ............... 376/248, 264, 268, 271, 376/288; 358/100, 299, 99

[56] References Cited

U.S. PATENT DOCUMENTS

| | | | |
|---|---|---|---|
| 4,636,846 | 1/1987 | Villarreal | 358/100 |
| 4,643,867 | 12/1987 | Hornak et al. | 376/248 |
| 4,650,634 | 3/1987 | Meuschke et al. | 376/248 |
| 4,886,348 | 12/1989 | Schmertz | 376/248 |
| 4,929,413 | 5/1990 | Kaufmann et al. | 376/248 |

Primary Examiner—Daniel D. Wasil
Attorney, Agent, or Firm—Robert R. Schroeder

[57] ABSTRACT

A fuel handling system for nuclear reactor plants comprising a camera containing underwater grapple means for transferring fuel units while submerged within a water containing reactor vessel.

12 Claims, 3 Drawing Sheets

FUEL HANDLING SYSTEM FOR NUCLEAR REACTOR PLANTS

FIELD OF THE INVENTION

This invention relates to an improvement in the mechanical means for refueling power generating nuclear reactor plants such as the conventional water cooled and moderated boiling water and pressure water system. The invention comprises a unique composite apparatus for handling nuclear fuel bundle units underwater within the nuclear reactor vessel, including a remotely operable grapple provided with a viewing camera for grasping and transfer fuel bundles submerged underwater.

BACKGROUND OF THE INVENTIONS

Typical water cooled and moderated nuclear reactor plants for power generation comprise a large pressure vessel containing cooling and neutron moderating water, and have a heat generating core of fissionable fuel submerged a substantial distance beneath the surface of the cooling and moderating water. The submerged fissionable fuel of the core must be periodically replaced, including the removal of spent fuel and replacement with new fuel, as well as rearranging partially spent fuel within the core. Due to the high levels of radioactivity within the nuclear reactor pressure vessel, the means for handling the water submerged fuel must be remotely controlled by an operator from out beyond the water containing reactor pressure vessel.

Conventional fuel handling systems comprise a fuel handling mast or pole extending down from above an open top of the water containing reactor pressure vessel with a grapple head affixed to the lower end of the mast. The system is designed for attachment to fuel bundles and their transfer while submerged in the reactor vessel to remove spent fuel and introduce new fuel, and rearrange fuel bundles within the core. The fuel handling mast is frequently supported on and operated from a movable platform which can travel back and forth over an open top of the water containing reactor vessel above the fuel core. Typically the fuel handling mast is mechanically telescoping downward from the supporting movable platform to facilitate reciprocal travel of the grapple head affixed to the lower end of the mast down into and back up from the interior of the reactor vessel. This arrangement provides greater versatility for transferring fuel bundles within and about the reactor vessel.

To facilitate operating personnel in manipulating such fuel handling systems with the grappling devices submerged a substantial depth below the surface of the water containing reactor vessel from a safe position above the open top of the reactor vessel, underwater viewing means are commonly employed. For example, underwater periscopes or television cameras suspended on a pole and connected to an above surface monitoring screen have been utilized for enabling remotely located operators to more accurately and clearly observe their underwater manipulation and relative location of the grappling head on the mast with respect to fuel assemblies to be transferred, and its application to fuel bundles.

However, controlling the manipulation of two distinct underwater units and their coordination by a remotely located operator is cumbersome and slow, and space limitations sometimes impede positioning of such underwater viewing mechanisms in conjunction with the fuel handling means.

Fuel bundles for typical water cooled and moderated nuclear reactor plants used to generate power commonly consist of a multiplicity of small diameter sealed tubes elements enclosing fissionable fuel which are grouped, spaced apart, into an assembled unit. Each assembled unit of the grouped tube elements is provided with an upper and lower end piece having sockets to receive and secure the end portions of the grouped tube elements, and the overall assembled unit is substantially surrounded with an open ended housing or channel. A handle or bail is provided on the uppe end piece of the assembled units for convenient and effective grasping and secure attachment of a transferring means such as a grapple device. The identification number of each assembled unit or fuel bundle is stamped on the top of its boil.

The grouping of a multiplicity of the fuel containing tube elements in assembled units greatly facilitates the transfer of fuel in reloading operations, among other benefits.

SUMMARY OF THE INVENTION

This invention comprises an improved system for handling fuel bundles within the water containing vessel of a nuclear reactor plant. The invention comprises a composite system of a mast with a grapple head mounted on the lower end thereof and having a viewing camera enclosed within the grapple head, for observing submerged fuel bundles and transferring the bundles underwater.

OBJECTS OF THE INVENTION

It is a primary object of this invention to provide an improved fuel handling system for nuclear reactor plants.

It is another object of this invention to provide a unique fuel handling system for transferring fuel bundles underwater within the housing vessel of a water cooled and moderated nuclear reactor plant.

It is a further object of this invention to provide a fuel handling system for water cooled and moderated nuclear reactor plants incorporating means for viewing underwater when carrying out the transfer of fuel bundles submerged within the water containing vessel of the nuclear reactor.

It is a still further object of this invention to provide a composite system for handling fuel bundles underwater within a nuclear reactor including an underwater grappling means containing a viewing camera integrated therein.

It is also an object of this invention to provide an underwater fuel handling system for nuclear reactors having an internal camera for close viewing of all underwater work performed with the handling system.

DETAILED DESCRIPTION OF THE INVENTION

Figure 1:
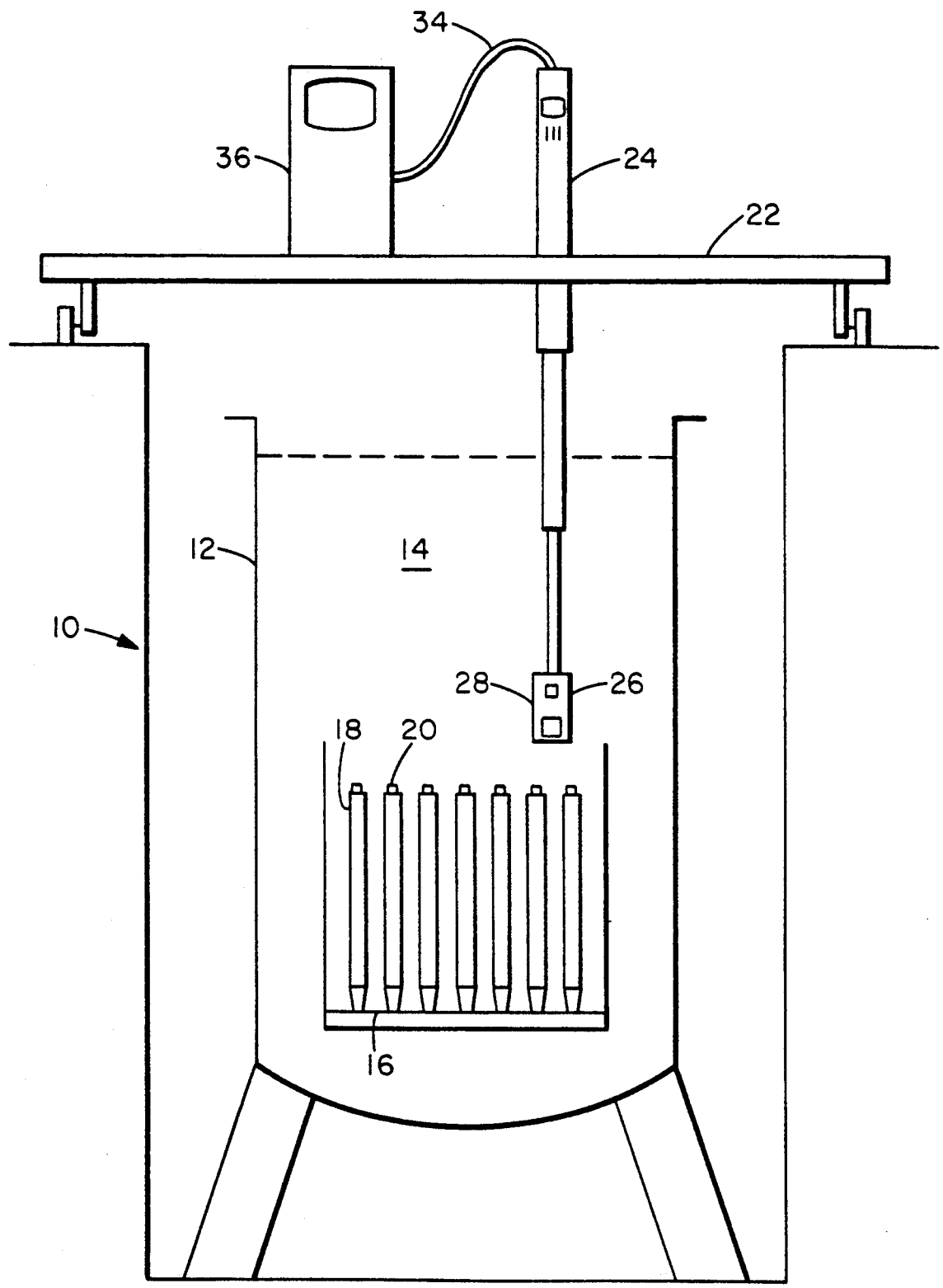
FIG. 1 of the drawings comprise a schematic illustration of a cross-section of a water cooled and moderated nuclear reactor plant.

Referring to the drawing, FIG. 1 in particular, a typical power generating, water cooled and moderated nuclear reactor plant 10, comprises a reactor vessel 12, having a removable top (not shown) which closes and seals the pressure vessel during operating of the reactor. The removable top of the pressure vessel is disconnected and deposited elsewhere during shutdowns for refueling and/or maintenance service. Reactor vessel 12 is substantially filled with water 14 for moderating the fission produced neutrons, cooling the heat produced by the fissions reaction of the fuel and transferring the generated heat energy in the form of steam or pressurized hot water to means for conversion into mechanical work, such as a turbine.

A fuel core 16 is located within the reactor vessel 12 submerged within the coolant/moderator water 14. The fuel core 16 is composed of a multiplicity of fuel bundles 18, each comprising a group of spaced apart sealed tube containers enclosing fissionable fuel and assembled and secured together in a composite unit. The upper end of the fuel bundle is provided with an end piece having a bail-like handle 20 for grasping by mechanical means to enable secure handling and transporting of the fuel bundles 18 when needed for refueling or rearranging partially spent fuel of the fuel core 16.

To facilitate handling and transferring of fuel bundles 18 for refueling and/or fuel rearrangement of the core 16, reactor plants 10 commonly employ a fuel bundle handling platform 22. The fuel handling platform 22 usually comprises a platform which bridges across the top of the reactor vessel cavity and the reactor vessel 12 and is movable back and forth over the top of the reactor vessel cavity and the reactor vessel 12 on suitable means such as wheels and track. The movable platform 22 enables operating personnel working thereon to be positioned at any location above any fuel bundle 18 within the fuel core 16 for servicing.

A fuel bundle handling mast 24 is supported on the fuel bundle handling platform 22 and is extendable downward therefrom into the reactor vessel 12 and the water 14 contained therein to just above the fuel core 16. The mast 24 can be arranged with the full length thereof sliding up and down to reach the core and retract therefrom, or telescoping in structure whereby it expands downward to reach the core and contracts upward therefrom.

A grapple head 26 is mounted fixed on the lower end of the fuel handling mast 24 for reaching down into the reactor vessel 12 and its water 14 contents for grasping the fuel bundle handles 20 to lift and transport the fuel bundles 18. The grapple head 26 comprises a housing 28 including hooks 30 for attaching to handles 20 and securely grasping the fuel bundles 18 for transfer. Both the mast 24 and grapple hooks 30 of head 26 are operated remotely by personnel located above the reactor vessel 12, such as on the fuel bundle handling platform 22.

In accordance with this invention, a television camera 32 is enclosed within the housing 28 of the grapple head 26. Camera 32 is provided with a transmitting and control cable 34 extending from the camera up the mast 24 to the movable platform 22 for personnel performing on the platform to observe underwater through the camera 32 and operate the camera and underwater lighting to enhance the view. The camera cable 34 is connected to a television monitor, such as monitor 36, for viewing by operating personnel, and/or a small screen viewing monitor can be affixed to the upper end of the handling mast 24 for the convenience of the personnel operating the grapple 26 through the mast.

The camera 32 is preferable located within the upper portion of the grapple head housing above the grapple hooks 30 whereby it does not interfere with the mechanism of operation of the grapple hooks, which can be of conventional design.

Camera 32 is preferably provided with a prismatic viewing head, and is horizontally rotatable within the grapple head housing 28 by the remote operator. The camera 32 is protected from radiation by a surrounding transparent quartz shield 38, such as an enclosing quartz cylinder, or other transparent material, and sealed therein by means of suitable seals such as o-rings to insure long term protection from radiation and water.

The grapple head housing 28 is provided with several windows 40 for the camera 32 to view through in different directions and transmit views from all relevant points within the reactor vessel 12 and about the fuel core 16. Preferable at least three windows openings 40, 40' and 40" are provided in different sides or locations of the grapple head housing 28 to permit the camera 32 to view in several different directions whereby all relevant aspects within the pressure vessel about the fuel core can be observed. For instance, window opening 40 looks out horizontally from one side of the grapple head housing 28, a second window opening 40' looks out from a second side of the housing 28, and a third window opening 40" cooperates with window 40' in guiding a view in a different direction. Additional window openings in the housing 28 can of course be provided for the camera 32. Window openings 40 in the housing are in apt alignment with the prismatic viewing head of the camera 32.

Figure 2:
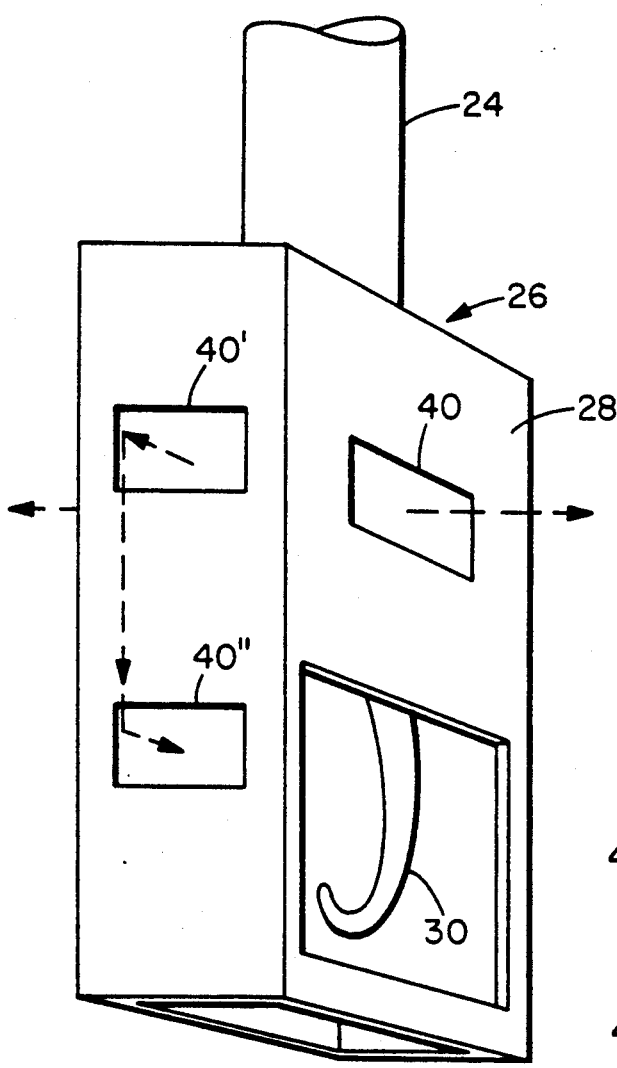
FIG. 2 of the drawings comprise a perspective view of a grapple head mounted on a mast for underwater service.
Figure 3:
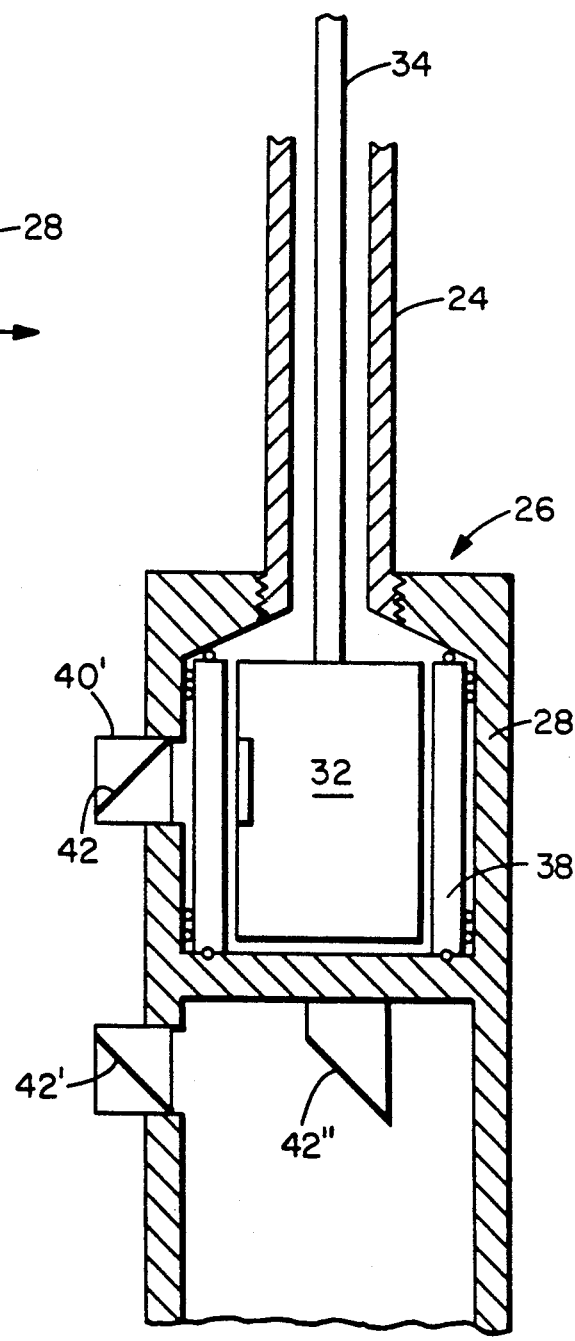
FIG. 3 of the drawings comprise a cross-sectional view of a portion of a grapple head mounted on a mast.
Figures 4, 5:
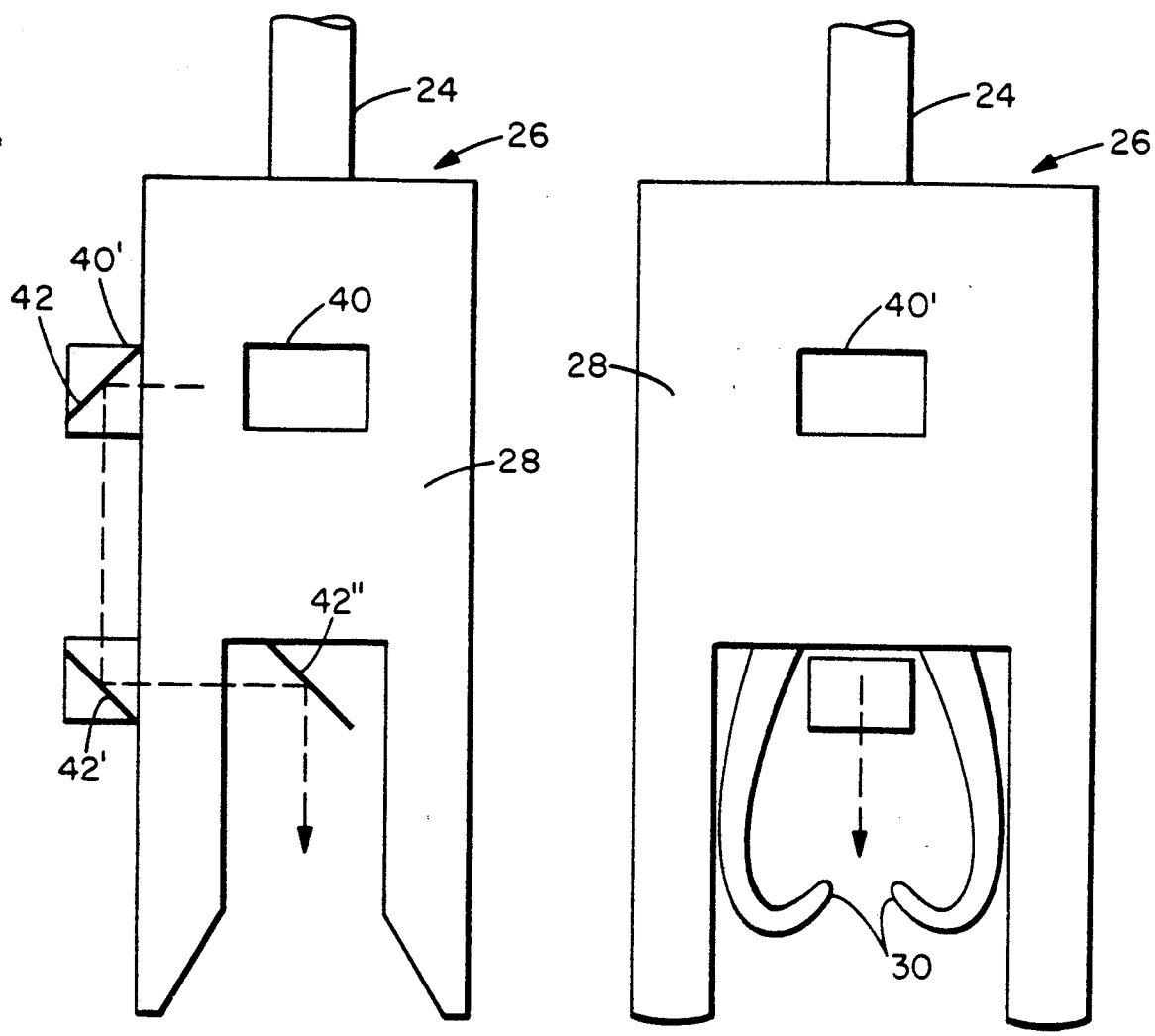
FIG. 4 of the drawings comprises a schematic view of a grapple head and an upper portion of a fuel bundle. and, FIG. 5 of the drawings comprises a schematic view of a side of the grapple head of FIG. 4 and an upper portion of a side view of a fuel bundle.

One window opening in the grapple head housing 28, such as window 40' in the second side, is arranged to view vertically downward from the central axis of the grapple head housing 28. One measure providing for achieving this vertically downward view for the camera 32, as shown in FIGS. 2, 3, and 4, comprises providing a cooperating window opening 40" below and aligned with window 40' in grapple head housing 28. Upper and lower, aligned window openings 40' and 40" are each provided with cooperating view reflecting angled surfaces 42 and 42', of approximately 45 degrees whereby the line of view of outward from the camera 32 within the grapple head housing 38 is turned about 90 degrees downward from horizontal to vertical, then turned again about 90 degrees laterally from vertical to horizontal back into the housing 38. Positioned generally centrally within the lower portion of the grapple head housing 28 is another view reflecting angled surface 42" of about 45 degrees which one more turns the view from surfaces 42 and 42' about 90 degrees downward from horizontal as received from surface 42' to vertical out through the open bottom of grapple head housing 28 and down between grapple hooks 30.

With such an arrangement of window openings 40 in the grapple head housing 28 aligned with the prismatic viewing head of the camera 32, by rotating the camera 32 enclosed within the housing 28, the camera can record and transmit to a monitor 36 a vertical view downward on to the fuel core 16 to guide and manipulate the grapple hooks 30 for attaching to the handles 20 of submerged fuel bundles 18 for transfer within and about the reactor vessel 12 and for viewing and recording fuel assembly identifications. Additionally by remote rotation of the camera 32 and aligning the prismatic viewing head of the camera with other window openings 40 in the grapple head housing 28, the camera can record and transmit to a monitor 32 horizontal views within the reactor vessel 12 and about the fuel core 16 to inspect and determine if any submerged fuel bundles 18 are not properly positioned or seated within the fuel core 16.

This arrangement provides protection for the transmitting camera 32 against physical damage while operating within the reactor vessel 12 under water, such as by collision with reactor components or fuel bundles 18. The versatile viewing capabilities of the camera 32 enclosed within the grapple head housing 28 also enable vertical viewing for examining the fuel core and verifying the core pattern and fuel bundle positioning therein.

What is claimed:

1. A fuel handling system for nuclear reactor plants comprising a reactor vessel having an openable top and removable cover and containing therein, submerged in water substantially filling the reactor vessel, a fuel core including a multiplicity of fuel bundles formed of groups of sealed tube elements enclosing fissionable fuel assembled into units, the fuel handling system comprising the combination of:
   a fuel bundle handling platform movable over the open top of the reactor vessel;
   a fuel bundle handling mast extendable downward from the platform with a lower end projecting into the open top reactor vessel to the fuel core submerged in water;
   a grapple head mounted on the lower end of the mast provided with grappling means for attaching to and transporting fuel bundles; and
   a camera enclosed within the grapple head which is provided with windows for general distance viewing of the fuel bundles of the fuel core with the camera in several directions, and for close up viewing of fuel bundles, and having a cable connecting the camera with at least one viewing monitor located above the reactor vessel for observing the fuel bundles of the fuel core.

2. The fuel handling system for nuclear reactor of claim 1, wherein some windows within the grapple head are provided with an angled surface for aiming the camera view in different directions.

3. The fuel handling system for nuclear reactor plants of claim 1, wherein the camera enclosed within the grapple head is surrounded by a radiation resisting quartz wall.

4. The fuel handling system for nuclear reactor plants of claim 1, wherein the camera containing grapple head is provided with a cooperating pair of hooks for grasping fuel bundles and transporting the bundles within the reactor vessel.

5. A fuel handling system for nuclear reactor plants comprising a reactor vessel having an openable top and removable cover for refueling and containing therein, submerged in water substantially filling the reactor vessel, a fuel core including a multiplicity of fuel bundles formed of groups of sealed tube elements enclosing fissionable fuel assembled into units, the fuel handling system comprising the combination of:
   a fuel bundle handling platform moveable over the open top of the reactor vessel;
   a fuel bundle handing mast extendable downward from the platform with a lower end projecting into the open top reactor vessel to the fuel core submerged in water;
   a grapple head mounted on the lower end of the mast provided with grappling means for attaching to and transporting fuel bundles; and
   a camera with a prismatic viewing head enclosed within the grapple head which is provided with at least three windows for viewing the fuel bundles of the fuel core from different perspectives, and having a cable connecting the camera with a viewing monitor located above the reactor vessel for observing the fuel bundles of the fuel core and for enabling aiming of the camera prismatic viewing head through each window by an operator.

6. The fuel handling system for nuclear reactor plants of claim 5, wherein windows within the grapple head area provided with an angled surface for aiming the camera prismatic viewing head in different directions.

7. The fuel handling system for nuclear reactor plants of claim 5, wherein the camera and prismatic viewing head enclosed within the grapple head are surrounded by a radioactive resisting quartz cylinder.

8. The fuel handling system for nuclear reactor plants of claim 5, wherein the camera containing grapple head is provided with a cooperating pair of grapple hooks for grasping and transporting fuel bundles.

9. The fuel handling system for nuclear reactor plants of claim 5, wherein the fuel bundle handling mast extendable downward from the platform is telescoping whereby it reciprocally moves the grapple head mounted on its lower end down to the fuel core and back up from the fuel core.

10. A fuel handing system for nuclear reactor plants comprising a reactor vessel having an openable top and removable cover for refueling and containing therein, submerged in coolant water substantially filling the reactor vessel, a fuel core including a multiplicity of fuel bundles formed of groups of sealed tube elements enclosing fissionable fuel assembled into units, the fuel handing system comprising the combination of:
   a fuel bundle handing platform moveable over the open top of the reactor vessel;
   a fuel bundle handing mast extendable downward from the platform with a lower end projecting into the open top reactor vessel to the fuel core submerged in water;
   a grapple head mounted on the lower end of the mast provided with grappling hook means for attaching to and transporting fuel bundles into and out from the fuel core; and
   a camera with a prismatic viewing head surrounded by a radioactive resisting quartz cylinder and enclosed within the grapple head which is provided with at least three windows with at least two windows provided with an angled surface for aiming the camera prismatic viewing head in different directions and thereby viewing the fuel bundles of the fuel core from different perspectives, and having a cable connecting the camera with a viewing monitor located above the reactor vessel for observing the fuel bundles of the fuel core and for enabling aiming of the camera prismatic viewing head through the windows by an operator.

11. The fuel handling system for nuclear reactor plants of claim 10, wherein the camera containing grapple head is provided with a cooperating pair of grapple hooks for grasping and transporting fuel bundles.

12. The fuel handling system for nuclear reactor plants of claim 10, wherein the fuel bundle handling mast extendable downward from the platform is mechanically telescoping whereby it reciprocally moves the grapple head mounted on its lower end down to the fuel core and back up from the fuel core to grasp and transport fuel bundles into and out from the fuel core.

* * * * *